United States Patent [19]

Stucker

[11] Patent Number: 4,702,882
[45] Date of Patent: Oct. 27, 1987

[54] QUICK DISCONNECT TOP NOZZLE FOR A NUCLEAR FUEL ASSEMBLY

[75] Inventor: David L. Stucker, Plum Borough, Pa.

[73] Assignee: Westinghouse Electric Corp., Pittsburgh, Pa.

[21] Appl. No.: 720,207

[22] Filed: Apr. 4, 1985

[51] Int. Cl.$^4$ .............................................. G21C 3/32
[52] U.S. Cl. ................... 376/446; 376/224; 376/233; 376/235
[58] Field of Search ................ 376/446, 224, 233, 235

[56] References Cited

U.S. PATENT DOCUMENTS

| | | |
|---|---|---|
| 3,235,463 | 2/1966 | Sankovich . |
| 3,770,583 | 10/1973 | Klaumb et al. . |
| 3,802,996 | 4/1974 | Jones ................................ 376/446 |
| 3,814,667 | 6/1974 | Klaumb et al. . |
| 3,828,868 | 8/1974 | Jabsen . |
| 3,968,008 | 7/1976 | Piepers ............................. 376/446 |
| 3,992,259 | 11/1976 | Anthony et al. . |
| 4,323,428 | 4/1982 | Schallenberger ................. 376/446 |

FOREIGN PATENT DOCUMENTS 1228610 4/1971 United Kingdom .

Primary Examiner—Donald P. Walsh

[57] ABSTRACT

A method and apparatus for removably attaching a top nozzle to a nuclear fuel assembly to permit easy access to the fuel rods. The quick disconnect top nozzle structure includes guide thimbles which are clearance fitted into an adapter plate of the top nozzle. Load collars are attached to the guide thimbles to support compressive loads such as those imposed by holddown springs. Tensive forces, such as lift forces, are transferred through the top nozzle into peripheral straps of a top spacer grid. The peripheral straps include extensions which resiliently latch onto the top nozzle for ease of assembly and disassembly.

21 Claims, 7 Drawing Figures

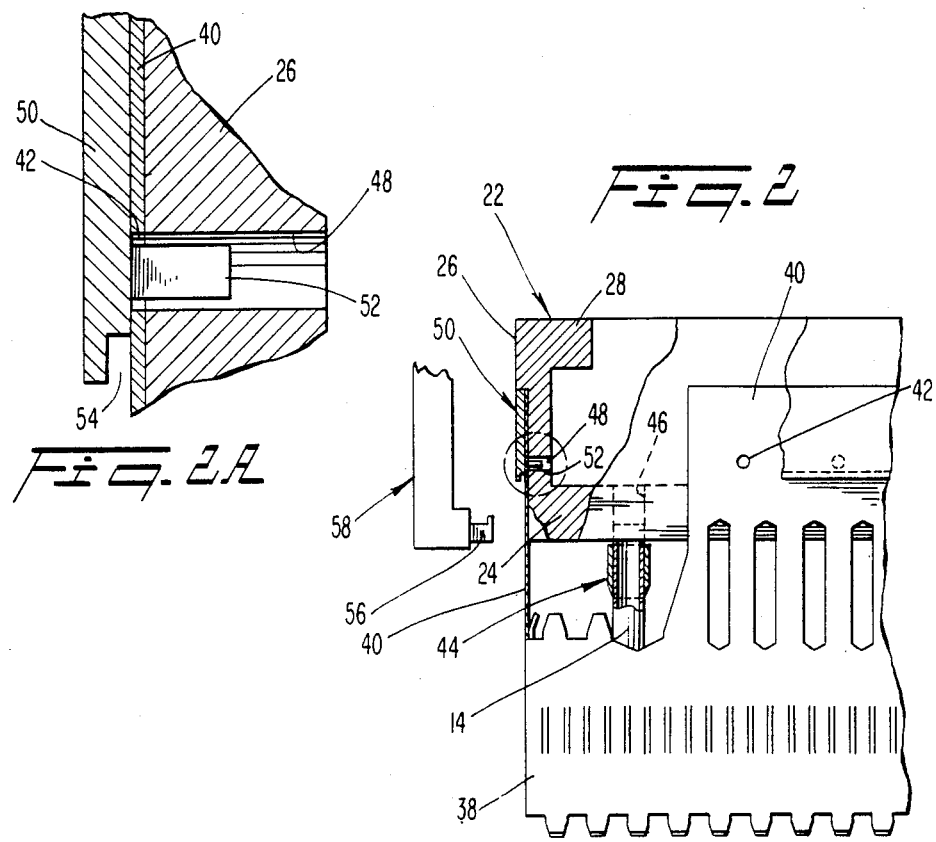
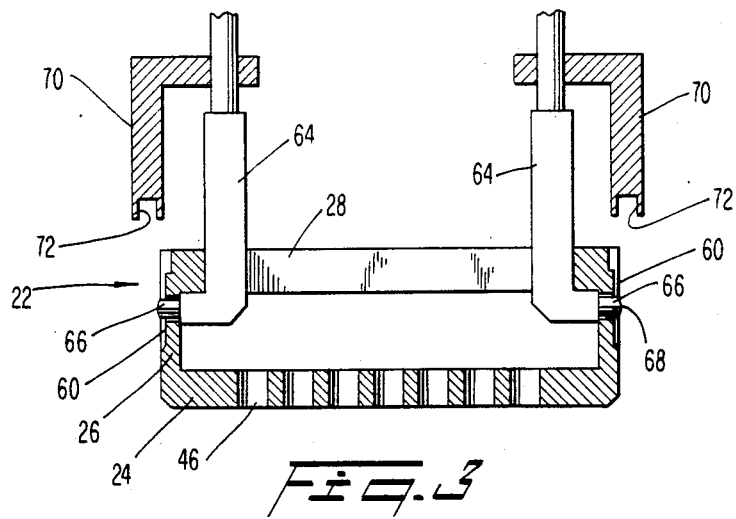

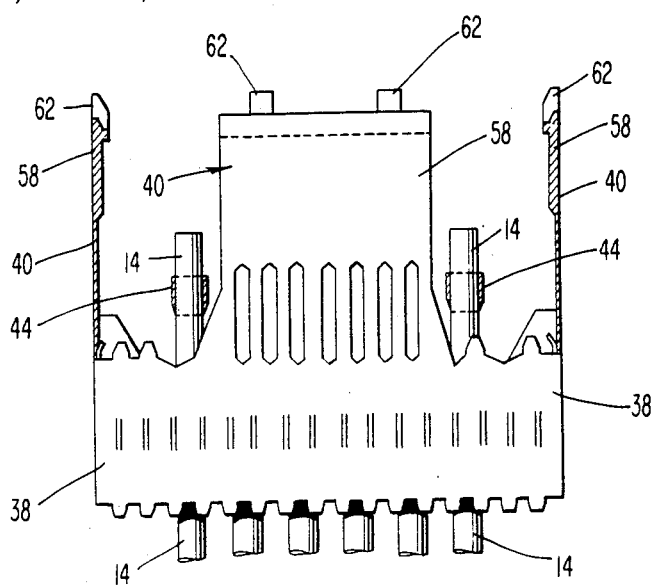
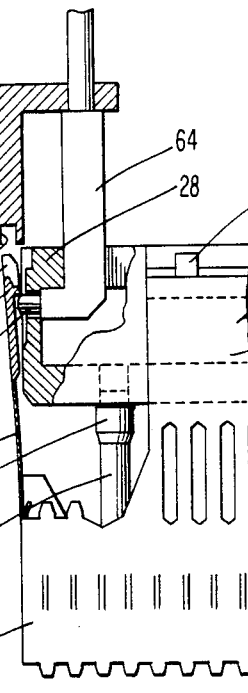
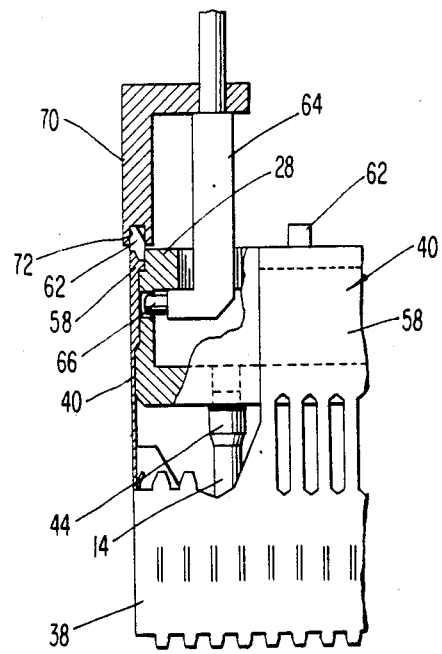

QUICK DISCONNECT TOP NOZZLE FOR A NUCLEAR FUEL ASSEMBLY

BACKGROUND OF THE INVENTION

Cross Reference to Related Applications

Reference is hereby made to the following copending applications directed to related subject matter and commonly assigned with the present application:
1. Nuclear Reactor Fuel Assembly With A Removable Top Nozzle, Ser. No. 537,775, filed Sept. 30, 1983;
2. Removable Top Nozzle And Tool For A Nuclear Reactor Fuel Assembly, Ser. No. 564,058, filed Dec. 21, 1983;
3. Improved Method And Apparatus For Removably Mounting A Top Nozzle On A Nuclear Reactor Fuel Assembly, Ser. No. 644,756, filed Aug. 27, 1984; and
4. Nuclear Reactor Fuel Assembly with a Removable Top Nozzle, Ser. No. 644,758, filed Aug. 27, 1984.

FIELD OF THE INVENTION

The present invention relates generally to a nuclear reactor fuel assembly top nozzle design, and more specifically to a nuclear reactor fuel assembly top nozzle design which simplifies access to the fuel assembly rod bundle and which transmits tensile loads from the top nozzle via grid skirt extensions of a top spacer grid.

DESCRIPTION OF THE PRIOR ART

In most nuclear reactors the core portion comprises a large number of fuel assemblies which include elongated fuel elements or rods grouped together in bundles and supported by a skeletal framework. The fuel assemblies are generally elongated structures which are supported by and aligned with upper and lower transversely extending core support plates. As a part of the skeletal structure, conventional fuel assemblies generally include a plurality of control rod guide tubes or thimbles held in an organized array by spacer grids axially spaced along and attached to the control rod guide thimbles. The top and bottom nozzles are secured to the control rod guide thimbles on opposite ends thereof, thereby forming an integral fuel assembly. The top and bottom nozzles respectively extend slightly above and below the ends of the fuel rods, capturing the rods therebetween. An example of a reactor core having a fuel assembly of this convention design is described in U.S. Pat. No. 3,235,463 to Sankovich.

If, during operation of a fuel assembly in a nuclear reactor, one or more fuel rods develop cracks or other flaws, they must be removed from the reactor. Since, in conventional fuel assemblies, the fuel rods are part of an integral assembly where the guide thimbles are semi-permanently attached to the top and bottom nozzles, it is difficult to detect and remove any failed or defective rods. To gain access to such rods, it is typically necessary to remove the affected fuel assembly from the reactor core and then break the attachments which secure the nozzles to the control rod guide thimbles. In doing so, the fuel assembly is often rendered unfit for further use in a reactor because of the damage done to both the guide thimbles and to the nozzles.

In view of the high costs associated with replacing fuel assemblies, efforts have been made to develop reconstitutable fuel assemblies in order to minimize operating and maintenance expenses. Several different types of reconstitutable fuel assemblies have been devised, the majority of which employ threaded arrangements for attaching the top nozzle to the control rod guide thimbles whereby the top nozzle can be removed to gain access to the fuel rods contained in the skeletal assembly.

A type of reconstitutable fuel assembly is described by Klaumb et al. in U.S. Pat. Nos. 3,770,583 and 3,814,667 which illustrate a top nozzle of the type having a hold-down device which essentially comprises coil springs coaxially disposed about upwardly extending alignment posts that are threaded through an end plate with fastener nuts located on the underside of the plate. An upper hold-down plate is slidably mounted on the alignment posts and the coil springs are interposed, in compression, between the hold-down plate and the end plate. A radially enlarged shoulder on the upper end of the alignment posts retain the hold-down plate on the posts.

In an attempt to improve upon the Klaumb et al. device, Anthony et al. set forth a different threaded joint arrangement as illustrated in U.S. Pat. No. 3,992,259.

Another reconstitutable fuel assembly contruction is illustrated and described in U.S. Pat. No. 3,828,868 to Jabsen which employs a threaded arrangement for attaching the top nozzle to the control rod guide thimbles so that the top nozzle can be removed to gain access to the fuel rods. The top nozzle removal method described essentially comprises unscrewing a multitude of threaded connections to release the top nozzle from the guide thimbles and then pulling the top nozzle over the external threads during removal. The sequence is reversed during top nozzle replacement.

The reconstitutable fuel assemblies which employ such threaded arrangements not only suffer from high manufacturing costs, complicated designs, difficulty in removing and reattaching the top nozzle, but, in addition, it has been found that after irradiation, the threaded connection may become corroded and inoperable, thus requiring destructive operations to the nozzle and/or the guide thimbles in order to remove the top nozzle which results in costly damage and generally renders the fuel assembly unfit for further use.

Further, repeated removal and replacement of the top nozzle from and to the threaded portions of the guide thimbles as well as retightening the threaded connections increases the risk of damaging the threads. Any thread seizure or damage incurred during removal and replacement can ruin the fuel assembly skeleton and require that a new fuel assembly be substituted for it.

Further, conventional reconstitutable fuel assembly designs utilize guide thimbles to support both tensive and compressive loads on the fuel assembly as well as for providing guidance for control elements. It is these multiple functions which give rise to arrangements which require complex and intricate components including numerous loose parts designed to permit the top nozzle to be disconnected from and reconnected to the fuel assembly.

An additional nonwelded top nozzle attachment arrangement is illustrated and described in U.K. Pat. No. 1,228,610. However, this fuel assembly is equally difficult to disassemble since the upper ends of the guide thimbles are fixed in holes formed in the top nozzle by being expanded after insertion in order to conform to the shape of the holes and annular grooves therein.

SUMMARY OF THE INVENTION

It is therefore an object of the present invention to provide a nuclear fuel assembly having an easily detachable and replaceable top nozzle.

It is a further object of the present invention to provide a top nozzle design which permits quick and simple access to fuel rods of a fuel assembly without introducing loose parts to the fuel assembly.

It is a further object of the present invention to provide a fuel assembly design wherein tensive loads on the top nozzle are transmitted to the fuel assembly via a top spacer grid.

It is a still further object of the present invention to provide a fuel assembly design wherein no fastening of guide thimbles to the top nozzle is required.

In order to accomplish these as well as other objects, the present invention comprises a fuel assembly having a longitudinally extending control rod guide thimble and a transversely extending top spacer grid. The fuel assembly further comprises a top nozzle and an attaching structure for removably mounting the top nozzle on the fuel assembly. The attaching structure comprises a first means for transferring compressive loads on the fuel assembly through the top nozzle and directly to the control rod guide thimble; and a second means for transferring tensive loads on the fuel assembly through the top nozzle and the transversely extending top spacer grid to the guide thimble. Preferably, the top nozzle includes a transversely extending adapter plate having an aperture therein. An upper end of the guide thimble is sized to clearance fit in the adapter plate aperture. A load collar is affixed to the the guide thimble adjacent the upper end thereof for transferring compressive loads through the adapter plate to the guide thimble.

Further, the top spacer grid is preferably provided with an upstanding skirt extension and a latch for securing the skirt extension to the top nozzle.

The invention is further directed to a method for assembling and disassembling a top nozzle of a fuel assembly having a guide thimble with an upper end, a top spacer grid, and a plurality of upstanding fuel rods. According to the invention, the method comprises the steps of providing means on the guide thimble for supporting compressive loads on the fuel assembly and providing means for resilently latching the top spacer grid to the top nozzle. In order to assemble the top nozzle on the fuel assembly, it is lowered onto the means for supporting compressive loads and then latched to the top spacer grid with the resilient latching means.

Preferably, a load collar attached to the upper end of the guide thimble is used to support the compressive load and the top nozzle includes an adapter plate having an aperture sized for clearance fitting the upper end of the guide thimble. The top nozzle is lowered with the aperture aligned with the upper end of the guide thimble until the adapter plate bears on the load collar.

Advantageously, the top spacer grid includes a grid skirt extension having an aperture therein and the top nozzle includes a resiliently biased locking pin. During latching the locking pin is held in a deflected position until the grid skirt extension aperture passes into alignment with the locking pin. Thereupon, the locking pin is released into the grid skirt extension aperture.

In order to remove the top nozzle, the locking pin is withdrawn from the grid skirt extension aperture and the top nozzle is lifted from the fuel assembly to thereby access the plurality of upstanding fuel rods.

Additional objects, advantages and novel features of the invention are set forth in the description which follows and will become apparent to those skilled in the art upon examination of the following or may be learned by practice of the invention. The objects and advantages may be realized and attained by means of the invention particularly pointed out in the appended claims.

BRIEF DESCRIPTION OF THE DRAWINGS

In the course of the following detailed description, reference will be made to the attached drawings which are incorporated in and form a part of the specification and in which:

FIG. 2 is a partially sectioned, elevational view of a portion of a fuel assembly of FIG. 1 with parts omitted for clarity showing the attachment between the top spacer grid and the top nozzle;

FIG. 2a is a sectional, enlarged, elevational view of the circled portion of FIG. 2;

FIG. 3 is a partial, elevational view of spring pullback tool useful for removing and inserting the top nozzle of the fuel assembly;

FIG. 4 is a exploded, partial, elevational view in partial section of a top nozzle and a top spacer grid with a top nozzle lift and release tool inserted according to a second embodiment of the invention;

FIGS. 5a and 5b are elevations, in partial section, of a portion of the top nozzle, top spacer grid connection of FIG. 4 with the top spacer grid in the released and engaged positions respectively.

DETAILED DESCRIPTION OF THE INVENTION

Figure 1:
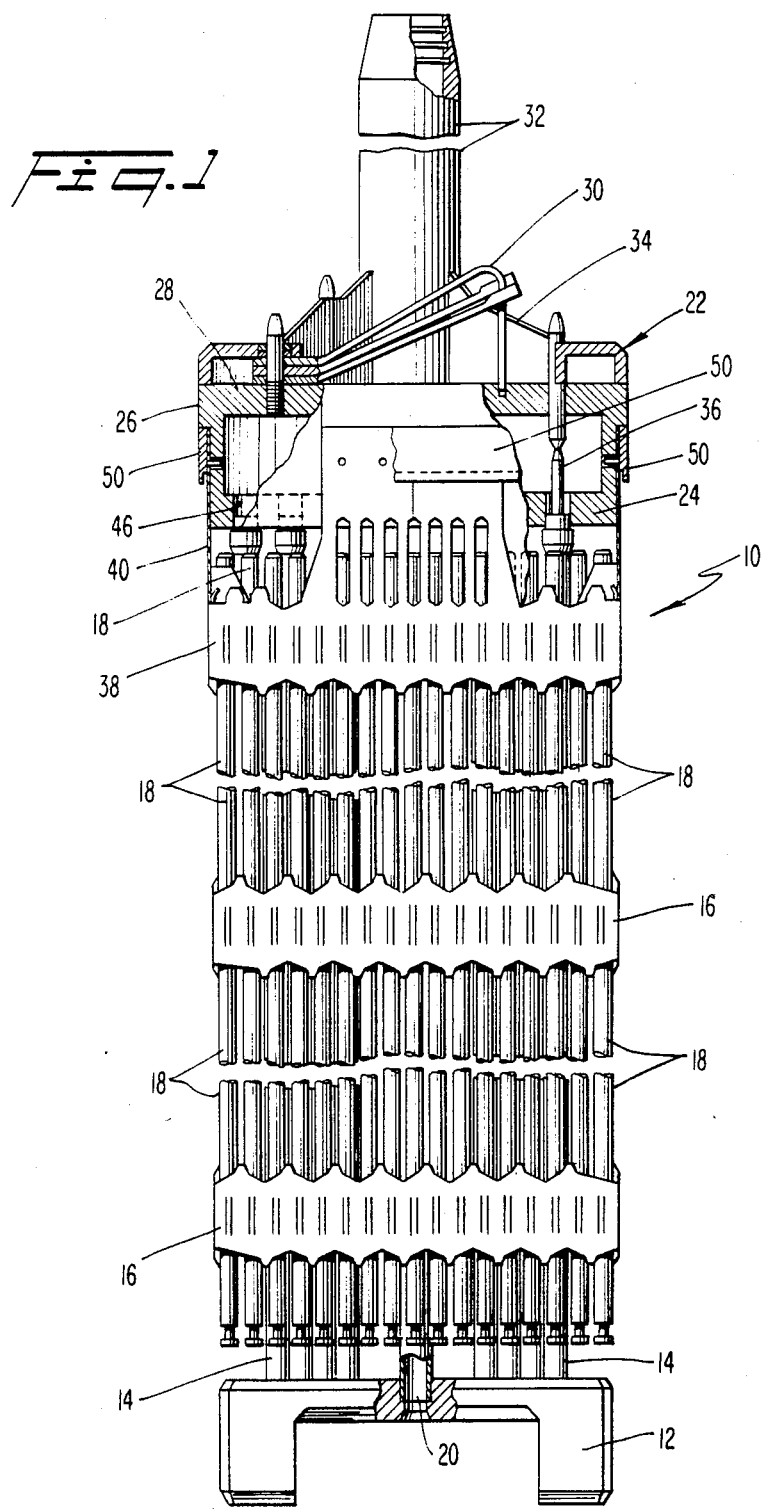
FIG. 1 is a partially sectioned, elevational view, with parts broken away for clarity, of a fuel assembly formed in accordance with the principles of the present invention.

Reference will not be made in detail to the presently preferred embodiment of the invention, examples of which are illustrated in the accompanying drawings. In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms. Referring now to the drawings, and particularly to FIG. 1, there is shown a partially sectioned elevational view with parts broken away for clarity of a fuel assembly constructed in accordance with well known practices, generally indicated by the numeral 10, which incorporates a preferred embodiment of the invention.

The fuel assembly 10 basically comprises a lower end structure or bottom nozzle 12 for supporting the assembly on the lower core plate (not shown) in the core region of a reactor (not shown). A number of longitudinally extending control rod guide thimbles 14 project upwardly from the bottom nozzle 12. A plurality of transversely extending fuel rods spacer grids 16 are axially spaced along the guide thimbles 14. An organized array of elongated fuel rods 18 are transversely spaced and supported by the spacer grids 16. An instrumentation tube 20 is located in the center of the assembly. An upper end structure top nozzle, generally designated by the numeral 22, is attached to the upper ends of the guide thimbles 14 in a manner more fully described below to form an integral assembly capable of being conventionally handled without damaging the assembly components.

The top nozzle 22 includes a transversely extending adapter plate 24 having upstanding sidewalls 26 secured to the peripheral edges thereof and defining an enclosure or housing. An annular flange 28 is secured to the top of the sidewalls 26. Suitably clamped to the annular flange 28 are holddown springs 30 (only one of which is illustrated in FIG. 1 for clarity) which cooperate with the upper core plate (not shown) in a conventional manner to prevent hydraulic lifting of the fuel assembly caused by upward flow of coolant through the assembly while also allowing for changes in the fuel assembly length due to core-induced thermal expansion and the like. Disposed within the opening defined by the annular flange 28 is a conventional rod cluster control assembly 32 having radially extending flukes 34 connected to the upper end of the control rods 36 for vertically moving the control rods in the control rod guide thimbles 14 in a well known manner. With the exception of the top spacer grid 38, each of the spacer grids 16 may be of any suitable, conventional design for laterally spacing and supporting the fuel rods 18.

The fuel assembly 10 depicted in the drawings is of the type having a square array of fuel rods 18 with the control rod guide thimbles strategically arranged within the fuel rod array. Further, the bottom nozzle 12 and likewise the top nozzle 22 are generally square in cross section. The specific fuel assembly represented in the drawings is for illustration only; it is to be understood that neither the shape of the nozzles nor the number and configuration of the fuel rods and guide thimbles are to be limiting and that the invention is equally applicable to shapes, configurations, and arrangements other than the ones specifically illustrated.

To form the fuel assembly 10, the transverse spacer grids 16 are attached to the longitudinally extending guide thimbles 14 at predetermined axially spaced locations. The fuel rods 18 are inserted through the spacer grids 16 in order to form the fuel rod array. The lower nozzle 12 is suitably attached to the lower ends of the guide thimbles 14 and the top nozzle 22 is attached to the upper ends of the guide thimbles 14 in the manner described below in accordance with the improved attaching structure of the present invention.

Referring now to FIGS. 2, 2a and 3, a first preferred embodiment of the improved attaching structure for removably mounting the top nozzle 22 on the upper end of the guide thimbles 14 and the top spacer grids 38 will be discussed. Although each of the guide thimbles 14 compressively supports the top nozzle 22, the description that follows is directed to the support arrangement for only one of the guide thimbles, the other guide thimbles supporting the top nozzle in the same manner. Similarly, although each side of the top fuel rod spacer grid 38 has an skirt extension 40 for tensively supporting the top nozzle 22, the description which follows is directed to the arrangement between the top nozzle 22 and only one of the spacer grid skirt extensions 40. It should however be understood that each of the four available skirt extensions 40 are preferably used.

The improved structure for removably supporting and attaching the top nozzle 22 includes thimble collars 44 which are welded or otherwise secured to the guide thimbles 14 and which are radially dimensioned to support the top nozzle 22 by bearing against the adapter plate 24 under compressive loading, and skirt extensions 40 formed in the top spacer grid 38 which removably attach, preferably without any loose attachment parts, to the sidewall 26 of the top nozzle 22 in order to support the fuel assembly under tensile loading. Details of these elements and connections as well as another preferred embodiment of a quick disconnect top nozzle fuel assembly will now be described.

According to a preferred embodiment of the present invention, compressive loads from the top nozzle 22, such as loads imposed by the holddown springs 30, are transmitted via the load collars 44 on the guide thimbles 14, while tensive loads, such as lifting loads, are transferred through the top nozzle 22 onto upwardly extending skirt extensions 40 of the top spacer grid 38. The top spacer grid assembly 38 may be fastened in any conventional manner, for example, by bulging techniques, to the guide thimbles 14. Thus, any tensive loads on the grid skirt extensions 40 are transferred through the spacer grids 38 to the guide thimbles 14 eliminating many of the costly, complex and loose components previously used to connect the guide thimbles to the top nozzle.

As alluded to above, the guide thimbles 14 are clearance fitted into apertures 46 in the adapter plate 24. The amount of radial clearance is preferably small, on the order of about two mils. Preferably, at least the portion of the guide thimble 14 in the vicinity of the top nozzle 22 is formed of stainless steel and the load collar 44 is formed from a coaxial stainless steel sleeve brazed, welded, or otherwise attached on to the guide thimble in the vicinity of its top end. The load collar 44 is radially dimensioned to be larger than the aperture 46, thereby any compressive load on the top nozzle 22 will be borne by the guide thimble 14 via the load collar 44. However, the clearance fit between the guide thimble 14 and the apertures 46 permits the top nozzle to be removed from the guide thimbles in the manner described below and require no unlocking, unscrewing, or other detachment operations between the guide thimble 14 and the top nozzle 22.

The grid skirt extension 40 may be of any desired geometry for providing mechanical support to the fuel assembly while permitting adequate coolant flow through the fuel assembly. The skirt extention 40 extends along the sidewall 26 of the top nozzle 22. It should be understood that the sheet metal skirt extensions 40, while strong under tensive stresses, will buckle relatively easy under compressive loading and are therefore not primarily relied upon to provide compressive strength. Each of the grid skirt extensions 40 includes means for securing the top spacer grid assembly 38 to the top nozzle 22 in a manner whereby it can support tensive loads. Such means may include aperture 42 in the grid skirt extension which aligns with apertures 48 in the sidewalls 26. Each sidewall 26 has a spring steel tang 50 extending generally parallel to the sidewall 26 to form therebetween a space for the skirt extension 40. A number of generally orthogonally locking pins 52, corresponding to the number of aligned apertures 42 and 48, are provided in the grid skirt extensions 40. The tangs 50 may be welded, integrally formed with, or otherwise secured to the sidewall 26 or to the annular flange 28. As best seen in FIG. 2a, the tang 50 preferably includes a notched end 54 which may be easily gripped by the end 56 of a pull-back tool 58. As best seen in FIG. 3, the end 56 of the pull back tool is complementary shaped with respect to the notched end 54 of the tang 50.

In use, the top nozzle 22 may be removed by pulling back the tang 50, i.e. to the left as viewed in FIG. 2a, until the locking pin 52 clears the aperture 42 whereupon the top nozzle may be simply lifted off of the clearance fitted guide thimbles 14. For reassembly, the tang 50 need only be pulled back with respect to the sidewall 26 enough to provide sufficient clearance between the sidewall and the locking pin 52 for passage of the grid skirt extension 40. Thereupon, the apertures 46 in the adapter plate 24 can be aligned with the guide thimbles 14 and the apertures 42 aligned with the apertures 48 and the locking pin 52. Upon release of the tang 50, the locking pins 52 will lock the sidewall 26 to the grid skirt extensions 40.

Turning now to FIGS. 4, 5a, and 5b, a second embodiment of the invention will be described. In the embodiment of FIG. 4, the spacer grid skirt extensions 40 terminate in a tang 58 which is designed to engage the complementary slot 60 formed in the sidewall 26 of the top nozzle 22. Each tang 58 preferably has an upstanding flange portion 62 designed to be engaged by a combination lift and release tool 64 as described below.

The sidewall 26 of the top nozzle is preferably provided with a hole 68 through which a skirt extention deflecting portion 66 of the lift release tool 64 is designed to protrude. The protruding portion 66 of the tool 64 may simply comprise a small cylindrical member sized to clearance fit through the hole 68 and protrude far enough to deflect the tang 58 out of engagement with the slot 60. This is best seen in FIG. 5a. In this position, the top spacer grid 38 is unlatched from the top nozzle 22. The tool 64 further comprises a tang capture portion 70 having a notched end 72 designed to capture a flange 62 on the tang 58 and hold the tang in a position deflected away from the sidewall 26 and out of mating engagement with the slot 60 so that when the protruding portion 66 of the tool 64 is withdrawn from contact with the tange 58, i.e. moved to the right as viewed in FIG. 5b, the tang capture portion 70 of the tool 64 can be lowered to engage the the flange 62 allowing the top nozzle to be lifted. During lifting, the portion of the tool 64 which bears against the annular flange 28 may be used to support the top nozzle.

Thus, by modifying the top spacer grid assembly to support tensive loads on the fuel assembly and by providing load collars on the guide thimbles to support compressive loads, a fuel assembly according to the present invention can be quickly and simply constituted and reconstituted and individual fuel rods in a fuel assembly can be handled on a routine basis at the end of each fuel cycle merely by removing the top nozzle in the manner described above. In addition to the other advantage described above, the quick disconnect top nozzle permits the enrichment of fuel rods within each fuel assembly to be more precisely tailored to more closely approximate the optimum hydrogen to uranium ratio for a given burnup. Further, the quick disconnect top nozzle permits rapid access to the fuel rods while eliminating the many costly, intricate, and loose attaching components of prior art attachment designs.

The foregoing description of a preferred embodiment of the invention has been presented for the purposes of illustration and description. It is not intended to be exhaustive or to limit the invention to the precise forms disclosed, and obviously many modifications and variations are possible in light of the above teachings. Other quick disconnect latching schemes between the top grid assembly and the top nozzle can be used and other compressive load supporting devices than simple load collars can be employed. The embodiments presented were choosen and described in order to best explain the principles of the invention and its practical application to thereby enable others skilled in the art to best utilize the invention in various embodiments and with various modifications as are suited to the particular use comtemplated. It is intended that the scope of the invention be defined by the claims appended hereto.

I claim as my invention:

1. In a fuel assembly having a top nozzle, a longitudinally extendign control rod guide thimble, and a spacer grid extending transversely about an upper regin of said fuel assembly an attaching structure for removably mounting the top nozzle on the fuel assembly comprising:

first means for transferring compressive loads on said fuel assembly through said top nozzle directly to said guide thimble;

second means for transferring tensive loads on said fuel assembly through said top nozzle and said spacer grid to said guide thimble.

2. The fuel assembly of claim 1 wherein said top nozzle includes a transversely extending adapter plate having an aperture therein, and wherein said guide thimble is sized ot clearance fit in siad aperture and said first means comprises a collar fixed to said guide thimble for transferring compessive loads through said adapter plate to said guide thimble.

3. The fuel assembly of claim 1 wherein said spacer grid has an upstanding skirt extension and said second means comprises a latch for securing said skirt extension to said top nozzle.

4. The fuel assembly of claim 2 wherein spacer grid has an upstanding skirt extension and said second means comprises a latch for securing said skirt extension to said top nozzle.

5. The fuel assembly of claim 3 wherein said top nozzle has a generally vertical sidewall and a tang extending generally parallel with respect to said sidewall and wherein said latch comprises a pin carried by said tang and a latching aperture formed in said grid skirt extension, said pin aligning with said latching aperture to latch said top nozzle to said grid skirt extension.

6. The fuel assembly of claim 5 wherein said sidewall includes an aperture adapted to be aligned with said latching aperture where said pin extends through said latching aperture and into said aperture.

7. The fuel assembly of claim 5 wherein said tang is formed of spring steel.

8. The fuel assembly of claim 3 wherein said top nozzle has a generally vertical sidewall and said latch comprises a slot formed in said sidewall and a complementary tang formed in said skirt extension.

9. The fuel assembly of claim 8 wherein said sidewall further includes an aperture in the region of said slot for passage of a tool and said tang further comprises an upstanding flange portion adapted to be engaged by said tool.

10. The fuel assembly of claim 8 wherein said spacer grid skirt extension is formed of spring steel and said tang is operable to assume a first stable position engaging said slot, and a second position resiliently deflected from said slot.

11. A fuel assembly for a nculear reaction comprising:
a bottom nozzle;

a longitudinally extending control rod guide thimble having an upper end, and a lower end attached to said bottom nozzle;

a plurality of transverse spacer grids and a top spacer grid axially space along said guide thimble for supporting an array of upstanding fuel rods;

a top nozzle removably mounted on the upper end of the control rod guide thimble for permitting access to said fuel rods upon removal thereof;

means attached to the upper end of the control rod guide thimble for transferring compressive loads on the fuel assembly through the top nozzle to the cnotrol rod guide thimble;

means for transferring tensive loads on the fuel assembly through the top nozzle to the top spacer grid.

12. The fuel assembly of claim 11 wherein top nozzle further comprises a transversely extending adapter plate having an aperture sized for clearance fitting at least a portion of the upper end of said control rod guide thimble and wherein said means for transferring compressive loads comprises a load collar fixed to the control rod guide thimble adjacent the upper end thereof and radially dimentioned to bear against the adapter plate when said top nozzle is lowered onto said control rod guide thimble whereby the upper end of the control rod guide thimble is clearance fitted into said aperture.

13. The fuel assembly of claim 11 wherein said top nozzle has a sidewall and said top spacer grid further comprises a longitudinally extending grid skirt extension extending towards said sidewall, and means for resiliently latching said grid skirt extension to said sidewall.

14. The fuel assembly of claim 13 wherein said latching means comprises an aperture formed in said grid skirt extention and a resiliently biased locking pin attached to said top nozzle for capturing said grid skirt extension at said grid skirt extension aperture wherein tensive loads on said fuel assembly are transferred from said top nozzle to the top spacer grid through the grid skirt extension.

15. The fuel assembly of claim 13 wherein said grid skirt extension is formed of resilient material and said latching means comprises a tang formed at an end of said grid skirt extension, and a complementary slot formed in said sidewall for accepting said tang, said grid skirt extension being movable between a first stable position wherein said tang engages said slot and tensile loads on the fuel assembly are transferred from top nozzle to the top spacer grid through the grid skirt extension and a second resiliently deformed position wherein a clearance is formed between said tang and said slot and said top nozzle can be freely removed from said fuel assembly.

16. A method of assembling and disassembling a top nozzle of a fuel assembly having a guide thimble with an upper end, a top spacer grid, and a plurality of upstanding fuel rods, comprising the steps of:

providing means on the guide thimble for supporting compressive loads on the fuel assembly;

providing means for resiliently latching the top spacer grid to the top nozzle:

lowering the top nozzle onto the means for supporting compressive loads: and latching the top nozzle to the top spacer grid with said resilient latching means.

17. The method of claim 16 wherein said means for supporting compressive loads comprises a load collar attached to the guide thimble adjacent the upper end thereof and wherein said top nozzle comprises an adapter plate having an aperture sized for clearance fitting the upper end of said guide thimble, and said step of lowering further comprises lowering said adapter plate aperture onto the upper end of the guide thimble until the adapter plate bears on said load collar.

18. The method of claim 16 wherein said top spacer grid includes a grid skirt extension having an aperture therein and said top nozzle includes a resiliently biased locking pin and said step of latching further comprises:

holding said locking pin in a deflected position until said grid skirt extension aperture passes into alignment with said locking pin; and releasing said locking pin into said grid skirt extension aperture.

19. The method of claim 18 further comprising the steps of:

withdrawing said locking pin from said grid skirt extension aperture;

lifting said top nozzle from said fuel assembly to thereby access said plurality of upstanding fuel rods.

20. The method of claim 16 wherein said top spacer grid includes a grid skirt extension having a locking tang and said top nozzle includes a sidewall having a slot for receiving said locking tang and said step of latching comprises:

deflecting said locking tang while lowering said top nozzle until said lock1ng tang engages said slot thereby latching said top nozzle to said grid skirt extension.

21. The method of claim 20 wherein said top nozzle sidewall further comprises an aperture through said slot for accepting a release and lift tool and further comprising the steps of:

inserting said tool into the aperture in said slot;

deflecting said locking tang out of engagement with said slot by means of said tool;

holding said locking tang out of engagement with said tang while lifting sald top nozzle by means of said tool.

* * * * *